No. 709,546. Patented Sept. 23, 1902.
G. S. LEE.
VEHICLE WHEEL.
(Application filed Jan. 27, 1902.)
(No Model.)
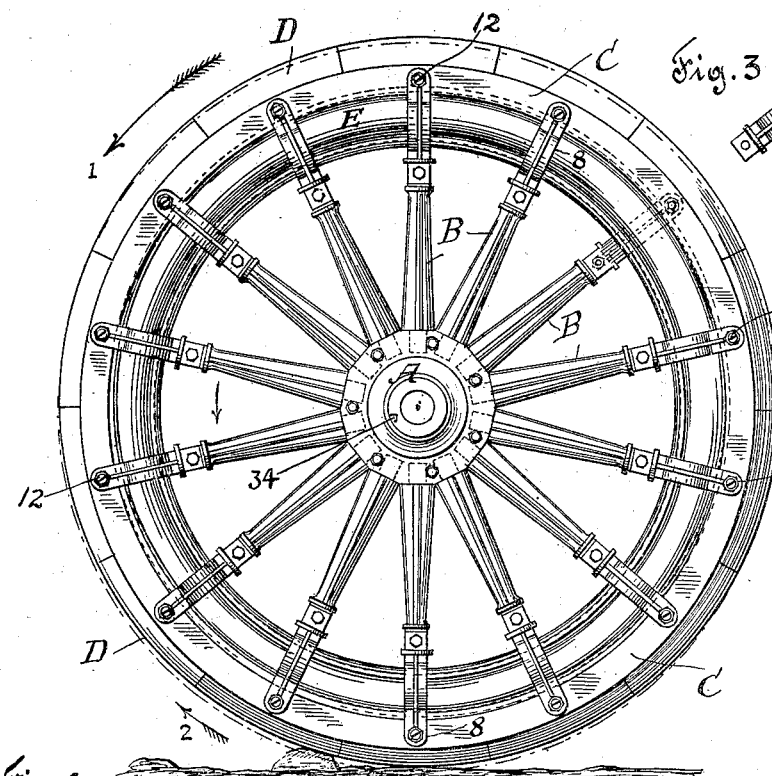
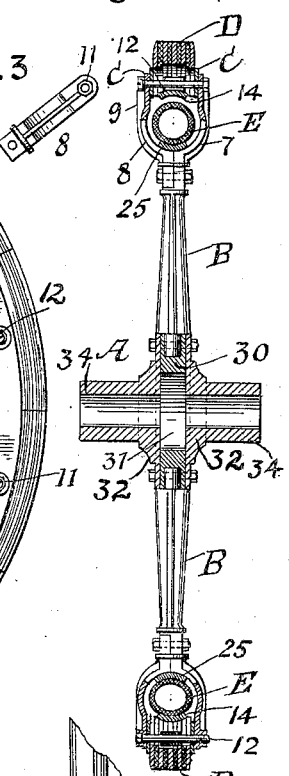
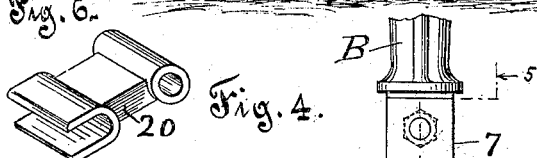
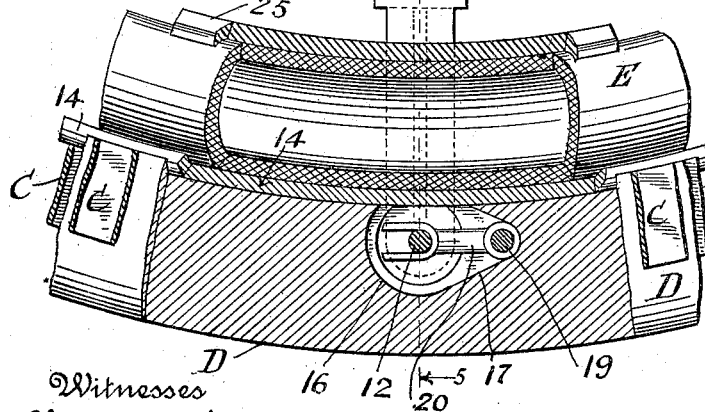
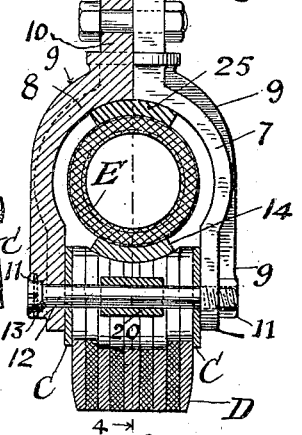
Witnesses
Charles Hanimann
Henry W Brown
Inventor
George S. Lee
By his Attorney
D Walter Brown

UNITED STATES PATENT OFFICE.

GEORGE S. LEE, OF HAWTHORNE, NEW JERSEY.

VEHICLE-WHEEL.

SPECIFICATION forming part of Letters Patent No. 709,546, dated September 23, 1902.

Application filed January 27, 1902. Serial No. 91,408. (No model.)

*To all whom it may concern:*

Be it known that I, GEORGE S. LEE, a citizen of the United States of America, and a resident of the village of Hawthorne, in the county of Passaic, State of New Jersey, have invented certain new and useful Improvements in Vehicle-Wheels, of which the following is a specification.

This invention relates to improvements in vehicle-wheels of that class wherein a solid or relatively non-elastic tire, on which the wheel rolls, is combined with an elastic member, as a pneumatic tube, in such a manner that when the wheel encounters an obstacle or roughness in the road the resulting shock to the solid tire is taken up by the elasticity of the pneumatic tube and is not communicated to the axle or hub.

Specifically, my present invention consists in a wheel wherein the hub, spokes, and rim are rigidly connected together, as in ordinary wheels. The solid or relatively non-elastic tire is set in the rim in such manner as to be capable of a limited motion around the rim in a curvilinear path which is eccentric to the axle of the wheel. The pneumatic tube or equivalent elastic member is set on the rim inside of the aforesaid solid tire and so that the aforesaid motion of the solid tire when encountering an obstacle or roughness of the road will compress the lower part of said pneumatic tube or equivalent elastic member, while diminishing the pressure on the upper parts of the same, whereby all shocks to the hub and axle are obviated and the vehicle has a smooth easy-rolling motion under all circumstances.

Referring to the drawings which accompany the specification to aid the description, Figure 1 is a side elevation of a wheel equipped with my invention and represented as surmounting an obstacle on the road. Fig. 2 is a vertical cross-section of the same. Fig. 3 is a side view of the removable part of the fork of one of the spokes. Fig. 4 is a broken section and elevation on a large scale on the plane of the line 4 4 of Fig. 5, showing part of the tire, pneumatic tube, rim, and spoke in the normal position. Fig. 5 is a cross-section, partly in elevation, on the plane of the line 5 5 in Fig. 4. Fig. 6 is a perspective view of a tire-lever.

The hub A, spokes B, and rim C are rigidly connected together, as indicated in Fig. 1. Certain details of these parts will be hereinafter more particularly described.

The outer end of each spoke B is preferably forked and made in two parts 7 8, respectively, to facilitate the insertion and removal of the tire D and pneumatic tube E, as shown in Fig. 5. The part 7 is integral with the body of the spoke, preferably shaped as shown in Fig. 5, and stiffened by the rib 9. The part 8, which has the same shape and stiffening-rib as part 7, is bolted at the shank 10 to said part 7, while a fillister-bolt 12 joins the outer ends of the fork, passing through the rim-plates C C, which form a channel for the solid or relatively non-elastic tire D, and through chambers in said tire D. The head and nut of said fillister-bolt 12 seat within a countersunk socket in the bosses 11, so as to be protected against being knocked off. A cotter-pin 13 may be put through bolt 12 to prevent same from turning loose. The said tire D, which is preferably formed of laminated strips of leather and rubber and with a metal rim 14, as set forth in my application filed in the United States Patent Office on the 17th day of February, 1902, Serial No. 94,416, has a working fit in said rims C C and is provided with chambers 16 at each bolt 12. Said chambers 16 are preferably provided with an internal extension 17, as seen in Figs. 4 and 5, through which passes a bolt or pin 19, the ends of which are fastened in the walls of said extension 17. A forked lever 20 is pivoted on said pin 19, said fillister-bolt 12 passing through the fork, Fig. 4.

With the foregoing construction it is evident that the tire D is movable on the rim within a range determined by the size and shape of the chambers in the tire D and of the forked levers 20 and that when said tire encounters an obstacle on the road it may have a motion relatively to the rim in a curvilinear direction eccentric to the axle of the wheel, the levers 20 in such circumstances turning around the pins 19 and bolts 12 and some of the bolts 12 moving in the forks of said levers, the ends of the forks, however, being so near to the curved walls of the chambers 16 that the bolts 12 cannot escape from the forks. The said eccentric motion of the tire around the rim is communicated to a suitable elastic member, as a pneumatic tube, in the following manner: A rim or annular saddle 25 is either loosely held in or is secured to the forks of the spokes B, and I prefer in some cases to let said rim 25 rest loosely in the forks; in other cases, as in heavy vehicles, to bolt the said rim to the spokes. On said rim 25 is placed the pneumatic tube E, inflated in the usual manner. When inflated, the said tube E centers the tire D, against which it normally presses all around the wheel; but when the tire D encounters an obstacle the lifting force of the obstacle moves the tire upward and around the rim C in a curvilinear direction, thereby compressing the lower part of the tube E, while diminishing the pressure of tire D on the upper parts of the tube. The shock of the wheels striking an obstacle is thus taken up by the elasticity of the pneumatic tube and the vehicle runs smoothly.

The essential feature of the invention being the movable connection between the tire and the rim, the details of the construction of other parts are less important; but I prefer those shown in the drawings. That of the forked spokes B and rim C for the tire has been hereinbefore described.

The preferred construction of the hub A is as follows: Said hub is composed of an inner polygonal plate 30, into which the ends of the spokes B are fastened. The central hole 31 in this plate is large enough to take the largest axle which can be used with the wheel. On either side of said plate 30 is fixed a plate 32 by through-bolts 33. Each plate 32 has a boss 34, which is bored out to fit a given axle. With this construction the hub can be easily adapted to various axles by merely changing the outside plates 32 32.

Now, having described my improvements, I claim as my invention—

1. The combination with a hub, spokes and rim rigidly connected together, of a pneumatic tube on said rim, a tire on said rim adapted to have an eccentric curvilinear motion around the rim within a limited range to compress said tube, and stops on the rim to limit the range of motion of the tire.

2. In a vehicle-wheel a spoke having a forked outer end adapted to span a tire and made in two separable pieces bolted together, substantially as shown.

3. In a vehicle-wheel, a spoke having a forked outer end adapted to span a tire and made in two pieces one of which is integral with the body of the spoke and the other is separable therefrom but secured thereto.

4. In a vehicle-wheel, the combination with a tire and rims C C of a spoke B having a fork at its outer end which spans said rims C C, said fork being in two separable pieces which are bolted together through said rims and also nearer the center of the wheel.

5. In a vehicle-wheel, the combination of the two-part forked spokes, the saddle 25, pneumatic tube E, rim C and movable tire D.

6. The combination with the hub, spokes and rim, of a chambered tire, and forked levers pivoted in the tire and engaging pins on the spokes to permit of limited movement of the tire on the rim.

7. The combination with a hub, spokes and rim, of a chambered tire and devices in the tire adapted to permit of limited motion thereof on the rim.

Signed at New York city this 25th day of January, 1902.

GEORGE S. LEE.

Witnesses:
 DAVID WALTER BROWN,
 ABM. VAN SANTVOORD.